United States Patent [19]

Daniels

[11] 4,216,602
[45] Aug. 12, 1980

[54] LINE RETRIEVING AND DISPENSING DEVICE

[76] Inventor: Dennis Daniels, Rte. 2, Box 782, Quilcene, Wash. 98376

[21] Appl. No.: 949,947

[22] Filed: Oct. 10, 1978

[51] Int. Cl.² .............................................. A01K 87/00
[52] U.S. Cl. ........................................ 43/18 R; 43/25
[58] Field of Search ...................... 43/18 R, 19, 24, 25

[56] References Cited

U.S. PATENT DOCUMENTS

| 2,806,700 | 9/1957 | Heimers et al. | 43/18 R |
| 2,851,811 | 9/1958 | Mantell | 43/18 R |
| 2,945,694 | 7/1960 | Heimers et al. | 43/18 R |
| 2,945,695 | 7/1960 | Heimers et al. | 43/18 R |
| 3,863,381 | 2/1975 | Ladany | 43/25 |

Primary Examiner—Othell M. Simpson
Assistant Examiner—J. T. Zatarga
Attorney, Agent, or Firm—Seed, Berry, Vernon & Baynham

[57] ABSTRACT

A set of traveling sheaves is moved relative to stationary sheaves with the sheaves containing wraps of fishing line from between a spool or source of the line and the hook or terminous of the line. By moving the movable sheaves relative to the stationary sheaves, the line can be quickly retrieved or quickly released when letting out line.

6 Claims, 4 Drawing Figures

U.S. Patent   Aug. 12, 1980   Sheet 1 of 2   4,216,602
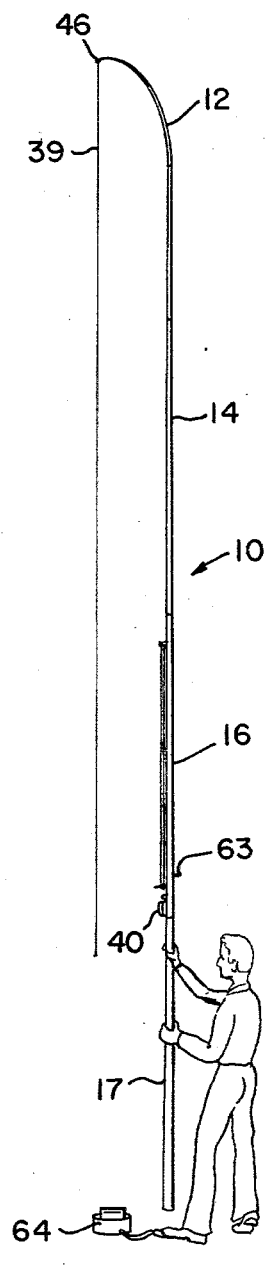
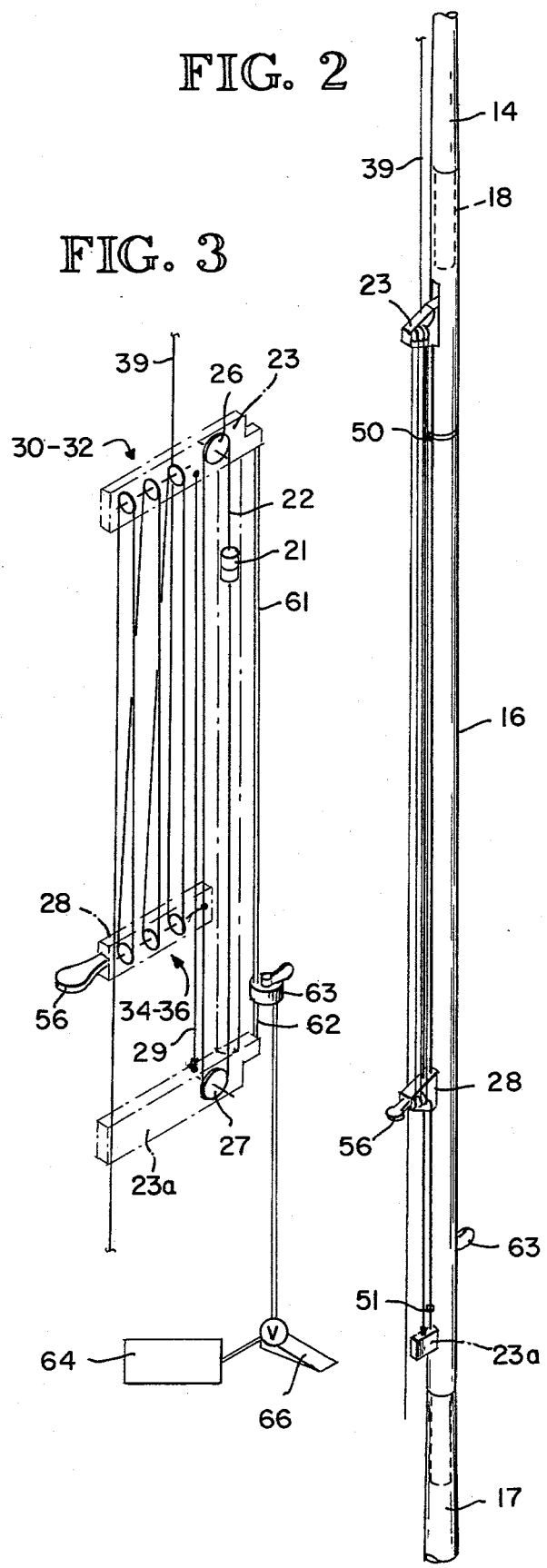
FIG. 1
FIG. 2
FIG. 3

LINE RETRIEVING AND DISPENSING DEVICE

BACKGROUND OF THE INVENTION

1. Field of the Invention

This invention pertains to line dispensing and retrieving equipment and, more particularly, to devices in which a generally predetermined amount of line is to be dispensed or retrieved at frequent intervals.

2. Description of the Prior Art

In certain types of fishing, practiced extensively in Great Britain and Europe, a long multiple section pole is used for placing the hook end of the line a considerable distance outwardly from the shore of the river or other body of water being fished. Generally, anywhere from 6 to 30 feet of line is then released for hooking the fish. In competitive fishing it is desirable to deliver the line to the area being fished and then retrieve the hooked fish as quickly as possible. This operation may be repeated many dozens of times during a fixed period of time in competition.

In the past anglers have had difficulty in making repetitive placements of the released line into the area being fished and then withdrawing a hooked fish to the shore. In some cases a 30 foot long pole of multiple sections was employed with a very short line at the end of the pole. This then involved breaking down the pole to an outer section where the angler could retrieve the hooked fish.

SUMMARY OF THE INVENTION

It is an object of this invention to provide a device for storing a few wraps of line on the pole for quick release and retraction of the line.

It is another object of this invention to provide a fishing line storing device which uses straight reciprocation of line wrapping elements on the pole to extend and retrieve the line.

Basically these objects are obtained by providing on a pole a set of stationary guides or sheaves and a movable set of guides or sheaves which can be moved toward or from the stationary members. The line passes from a spool or other supply through multiple wraps between the stationary and movable sheaves and then out through the tip of the rod. By moving the movable sheaves toward the stationary sheaves, the length of the wraps is decreased so that line can be pulled out through the tip of the rod. Conversely by lengthening the distance between the stationary and movable sheaves the line will be retracted back through the tip of the rod.

BRIEF DESCRIPTION OF THE FIGURES OF THE DRAWINGS

FIG. 1 is a schematic of a fishing pole embodying the invention.

FIG. 2 is a fragmentary side elevation with parts broken away for clarity of an embodiment of the invention.

FIG. 3 is a schematic of the line retrieving and dispensing device.

DETAILED DESCRIPTION OF THE PREFERRED EMBODIMENTS

Figure 4:
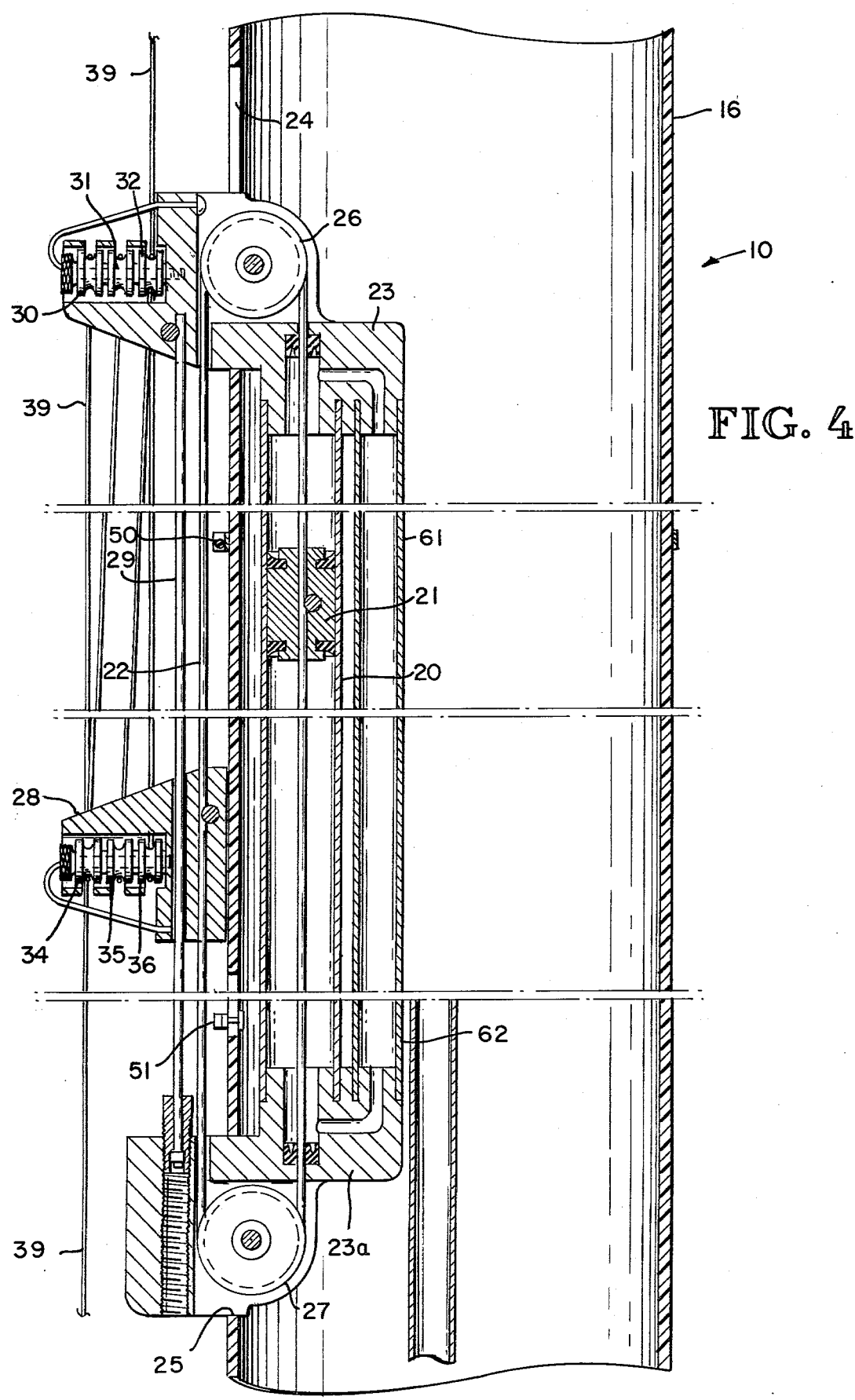
FIG. 4 is a fragmentary longitudinal section of the retrieving and dispensing device.

A fishing pole 10 is preferably formed of multiple portions such as a tip portion 12, a standard middle portion 14, a linear line collecting portion 16 and a handle portion 17. These portions can be of a single tubular or solid rod but preferably are individual tubular glass or carbon fiber hollow tubes joined together by conventional friction ferrules 18. These sections or portions can be a convenient size such as two meters and additional sections can be added. The total rod length may be from twelve to thirty feet.

In a preferred embodiment, linear line collecting portion 16 is provided with an internal rigid tube forming an elongated plugged cylinder 20 in which a piston 21 is slidably received. The piston is coupled to a line 22 that passes out of an opening 24 toward the tip end and again out of an opening 25 near the handle end. The line 22 passes over sheaves 26 and 27 and is then coupled to a carriage 28. The sheaves 26 and 27 are mounted on brackets 23 and 23a secured to the rod portion 16 within the openings 24 and 25. A taut line 29 is fixed to the brackets. The carriage slides on the line 29.

Mounted on the bracket 23 are a set of stationary sheaves or guides 30-32. Mounted on the carriage 28 are a second set of movable sheaves or guides 34-36. As is readily apparent by moving the piston 21, the movable sheaves 34-36 can be reciprocated toward and away from the stationary sheaves 30-32.

Line 39 from a standard spool 40 is wrapped with multiple wraps around the stationary and movable sheaves and thence passes out through an eye 46 at the tip end of the rod. The line is connected to suitable bait and a hook.

Adjustable stops 50 and 51 are provided on the guide track to limit the stroke of the movable carriage 28 and thus limit the amount of line which can be extended and withdrawn. In one embodiment a finger grip 56 is provided so that the carriage 28 can be manually reciprocated and thus the piston 21 and additional structure can be eliminated. In the alternative the piston 21 can also be carried in a cylinder or tube externally of the rod or can be mounted within a cylindrical rod portion. To operate the fluidic or air powered system air lines 61 and 62 which are coupled to a conventional two position, rotary valve 63. The valve is placed near the handle end of the line collection portion 16 so that it is easily accessible to the angler. Air from an accumulator 64 pressurized from a conventional foot air pump 66 provides a pressurized supply of air or fluid selectively coupled to either line 61 or 62 for determining the direction of the movement of the piston 21. In the alternative a standard pressurized CO-2 cartridge can be substituted for the pump and accumulator. By reciprocating the piston 21 the carriage 28 follows, shortening or lengthening the distance between the movable and fixed sheaves.

In this type of fishing where the line is extended or retrieved numerous times but is generally always the same amount it is apparent that the adjustable reciprocatory stroke of the carriage enables such repetitive accurate dispensing of an amount of line. Secondly, the line can very rapidly retrieved by the single stroke of reciprocation rather than by numerous turns of a reel.

Sometimes fishing is done using many rod sections but a short length of line. If multiple sections are added toward the tip of the rod the movable sheaves can be moved toward the stationary sheaves to lengthen the line so that the hooked fish can be removed by the angler. The linear line collecting and extender portions or sections can be removed entirely and a short handle section with a conventional bait casting reel added where more conventional bait casting is employed.

While the preferred embodiments of the invention have been illustrated and described, it should be apparent that variations will be apparent to one skilled in the art without departing from the principles herein. Accordingly, the invention is not to be limited to the specific embodiment shown in the drawings.

I claim:

1. A line retrieving and casting device for use on an elongated pole having at least an outer and inner portion, comprising:

line storage means on said inner portion for accumulating wraps of line terminating at a terminal end and adapted to have an object attached to said terminal end;

said line storage means including a plurality of transversely spaced stationary first line guiding means mounted on said outer portion of said pole for receiving a plurality of wraps of said line, a plurality of movable transversely spaced second line guiding means freely movably mounted on said inner portion of said pole for movement from a first fully retracted position remote from said first line guiding means to a second fully extended position adjacent said first line guiding means and for receiving respective opposite wraps of said line from said first line guiding means with transversely spaced non overlapping partial loops of line each defined by a single wrap only around each set of corresponding transversely spaced first and second line guiding means, and actuating means for respectively letting out line by allowing reduction in the lengths of said wraps or retracting line by lengthening the wraps, said actuating means including means for moving the second line guiding means in a single movement toward and away from the first line guiding means between said fully extended and fully retracted positions.

2. The device of claim 1, said means for moving said second means including a fluidic piston, an elongated cylinder housing said piston, a track, a carriage mounted for reciprocable movement on said track, flexible means coupling said piston to said carriage wherein reciprocation of said piston moves said second means, and a fluidic pressure supply operative for providing fluidic pressure in either of two directions to said cylinder for reciprocating said piston.

3. The device of claim 1 said means for moving the second means including a track for guiding the second means along said portion of said rod, and a handle for manually reciprocating said second means.

4. The device of claim 1, said line storage means further including a supply spool coupled to said wraps for initially determining the length of line to be used.

5. The device of claim 1, said actuating means including a manually movable handle.

6. The device of claim 1, said line being a light-weight fishing line, said first and second line guiding means being located externally of said pole for free movement of said fishing line during casting.

* * * * *